United States Patent [19]
Cravens et al.

[11] Patent Number: 6,086,134
[45] Date of Patent: Jul. 11, 2000

[54] MOVEABLE COVER ASSEMBLY

[76] Inventors: Bradely Joseph Cravens, 5272 Niles Dr.; Christopher Reed Cravens, 377 Yosemity Dr., both of Corcoran, Calif. 93212

[21] Appl. No.: 09/000,577

[22] Filed: Dec. 30, 1997

[51] Int. Cl.$^7$ .................................................. B60P 7/02
[52] U.S. Cl. .................... 296/100.06; 296/165; 296/173; 296/100.08
[58] Field of Search ........................ 296/100.2, 100.03, 296/100.06, 165, 173, 100.08, 100.1

[56] References Cited

U.S. PATENT DOCUMENTS

| | | | |
|---|---|---|---|
| 3,155,423 | 11/1964 | Cripe | 296/100.08 |
| 3,339,321 | 9/1967 | Schmidt | 296/173 |
| 3,360,294 | 12/1967 | Cieslak | 296/165 |
| 3,495,866 | 2/1970 | Bontrager | 296/173 |
| 3,507,535 | 4/1970 | Wallace | 296/173 |
| 3,649,073 | 3/1972 | Whittemore . | |
| 4,220,370 | 9/1980 | Rice | 296/165 |
| 5,002,329 | 3/1991 | Rafi-Zadeh . | |
| 5,102,185 | 4/1992 | Lake . | |
| 5,129,697 | 7/1992 | Heikkinen | 296/165 |
| 5,364,154 | 11/1994 | Kaiser | 296/100.08 |
| 5,366,266 | 11/1994 | Harbison | 296/100.02 |
| 5,375,900 | 12/1994 | Tessenyi et al. | 296/100.08 |
| 5,505,515 | 4/1996 | Turner | 296/165 |
| 5,769,485 | 6/1998 | Bontrager et al. | 296/173 |

OTHER PUBLICATIONS

"Samsonite Jumps into Auto Accessories with Both Feet", Nov. 4, 1997, Aftermarket Business Show Daily, p. 4.
"The Cushy Truck Market just keeps Getting Cushier", Nov. 4, 1997, Aftermarket Business show Daily, pp. 22, 26 and unknown.
"Access Roll–up Cover" 1997 Price Guide.
Specialty Covers, Inc.'s brochure.
Six pages of various truck cover brochures.

*Primary Examiner*—Joseph D. Pape
*Assistant Examiner*—Kiran Patel
*Attorney, Agent, or Firm*—Merek & Voorhees

[57] ABSTRACT

A moveable cover assembly including a cover, a support frame, a motor and drive linkage. The motor automatically raises and lowers the cover such that the cover maintains a horizontal orientation throughout the raising and lowering process. This permits the particular object utilizing the cover assembly such as a pick-up truck, a trailer and/or a camper to store and\or transport tall objects. In an alternative embodiment, the cover is pivotally mounted to the support frame so that the cover can be opened like a hatch back to gain access to the particular object being covered. In another embodiment, the cover may be manually raised and lowered. The manual operation is performed by utilizing a conventional lug wrench. In a further alternative embodiment the support frame is two tiered so that the cover assembly can be raised to greater heights when utilized in environments requiring such, e.g. campers.

7 Claims, 8 Drawing Sheets

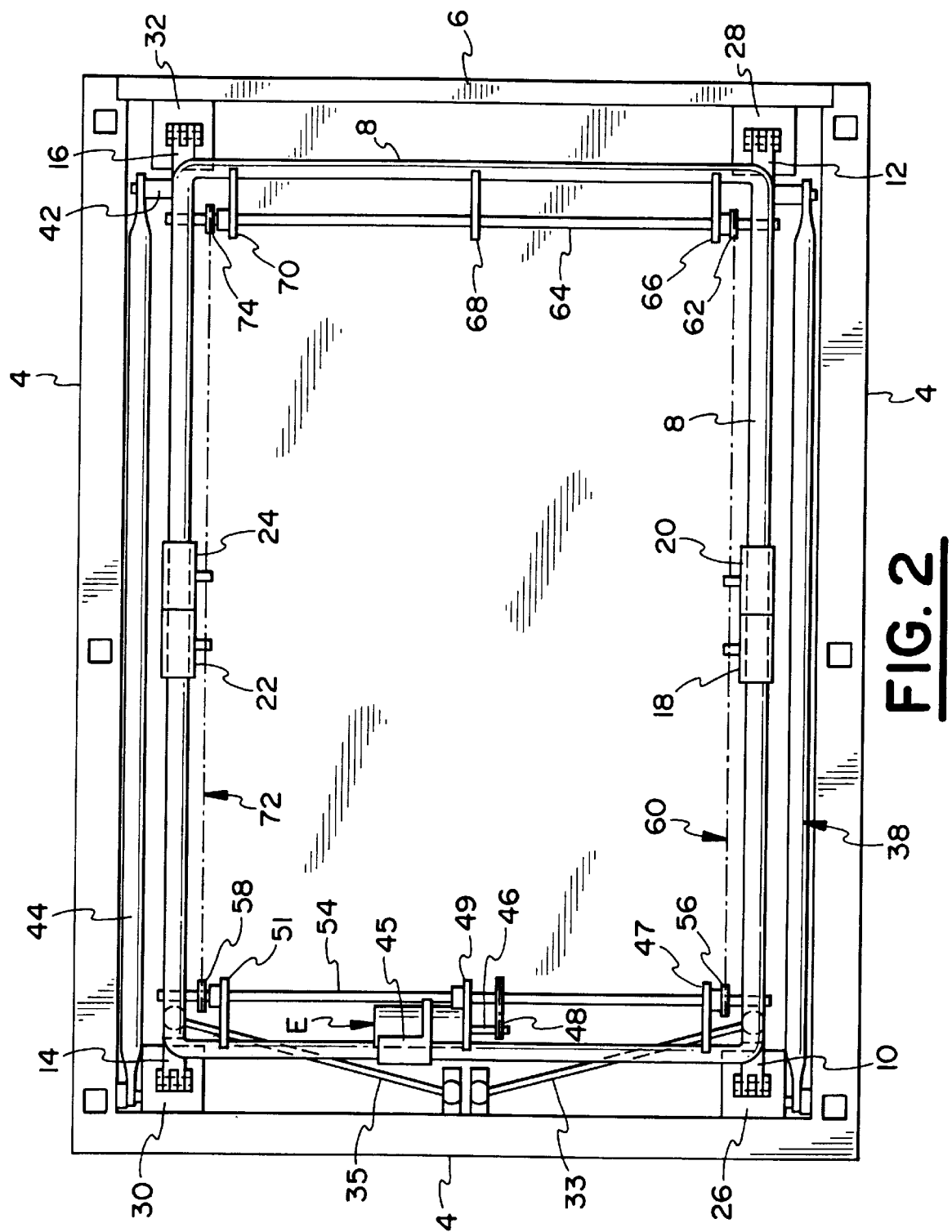

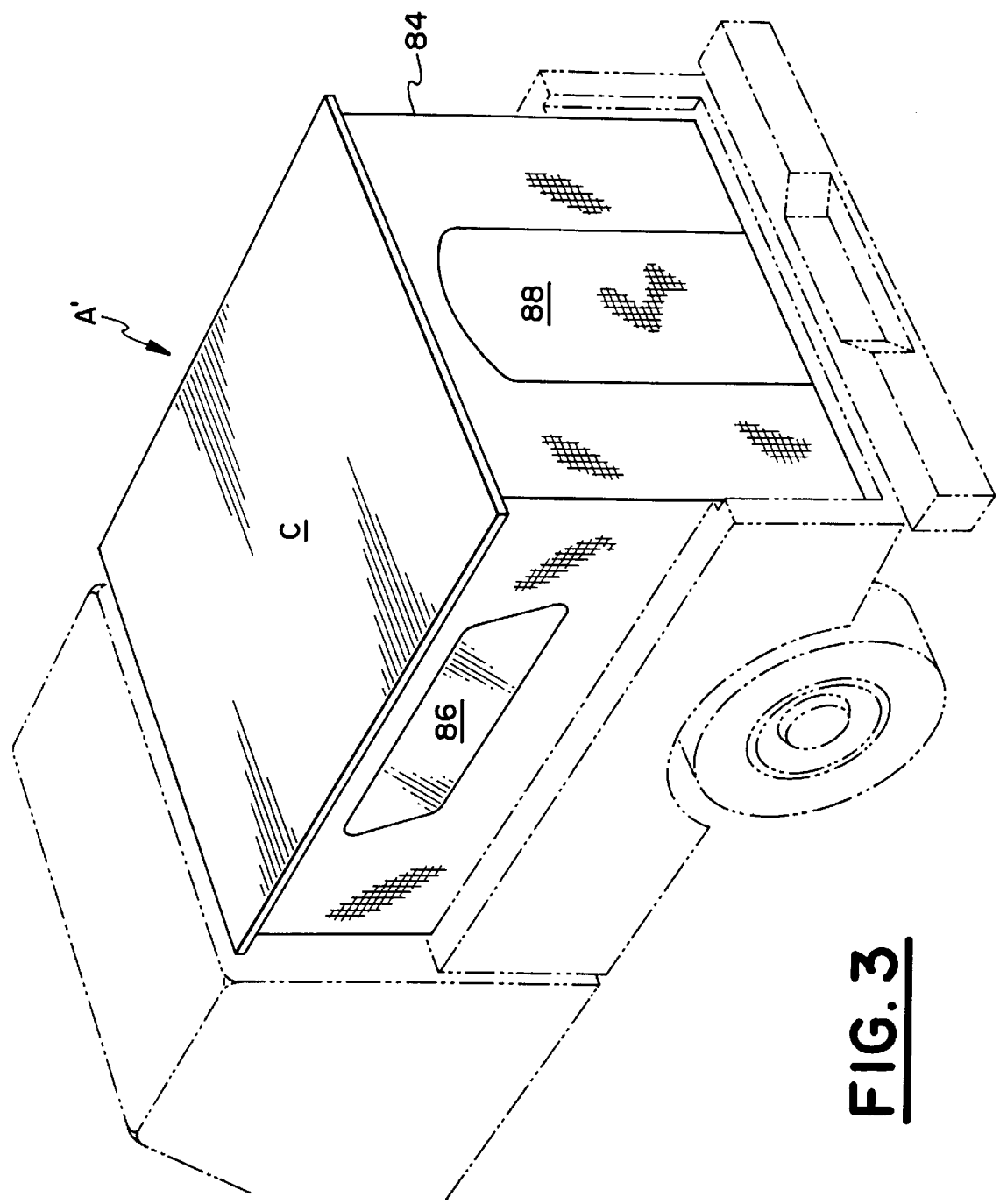

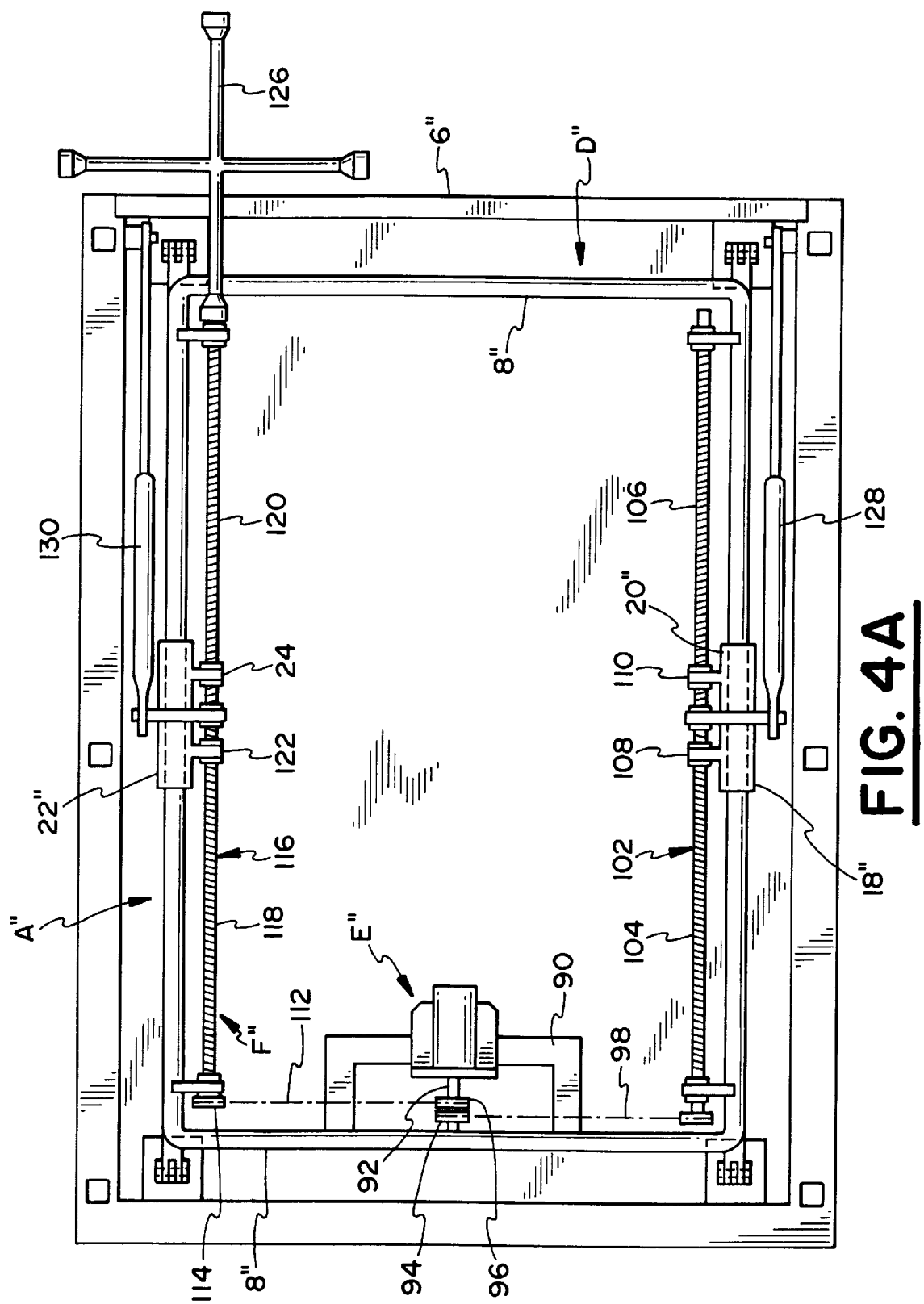

MOVEABLE COVER ASSEMBLY

FIELD OF THE INVENTION

The present invention is directed to a device for covering various portions of a vehicle. As an example of its use, the present invention may be employed to cover the bed of a pick-up truck. However, the aforementioned reference to the use as a cover for the bed of a pick-up truck is not to be construed as limiting the invention to such use. On the contrary, the present invention can be utilized in a variety of different environments including as a cover for campers and/or trailers.

BACKGROUND OF THE INVENTION

A number of cover assemblies have been previously developed to cover all or portions of the bed of full size, mid-size and light pick-up trucks. Examples of such previously developed cover assemblies are disclosed in U.S. Pat. Nos. 3,649,073; 5,002,329; 5,102,185; and 5,366,266. The cover assembly illustrated in U.S. Pat. No. 5,102,185 is of the hatch back type in that the cover pivots about a point adjacent the cab of the vehicle. This type of cover has the inherent disadvantage of not being able to transport objects having heights greater than the height of the cab of the vehicle without first removing the cover assembly completely. In addition, this type of cover is always readily visible detracting from the overall aesthetic appearance of the pick-up truck or other vehicle. One variation of the type of cover assembly disclosed in U.S. Pat. No. 5,102,185 is a hatch back type cover with a lower profile, i.e. a cover assembly whose height is substantially less than the height of the cab of the vehicle. This type of cover assembly limits even further the type of objects which can be transported without removing the cover. In addition, the low profile of this type of cover assembly makes it difficult to remove the objects stored directly adjacent the cab of the vehicle.

The cover assemblies illustrated in U.S. Pat. Nos. 5,002,329; 5,102,185; and 5,366,266 are similar in that the covers are mounted to complex support frames which are manually raised and lowered to gain access to the bed of the pick-up truck. These cover assemblies suffer from a number of inherent disadvantages. Specifically, the covers must be manually raised via a complex support structure. In addition, these cover assemblies only move in one direction thereby limiting the manner in which access can be gained to the bed of a pick-up truck. Further, the supporting structure is such that the bed of the pick-up truck cannot be effectively and inexpensively sealed. Finally, the support structure of these cover assemblies leads to an unsightly profile for the cover assembly.

OBJECTS AND SUMMARY OF THE INVENTION

An object of the present invention is to provide a novel and unobvious cover assembly.

Another object of an embodiment of the present invention is to provide a cover assembly that can be opened in more than one manner.

A further object of an embodiment of the present invention is to provide an automatic cover assembly that can accommodate relatively tall objects without removal of the cover assembly.

Yet a further object of an embodiment of the present invention is to provide a cover assembly that can be operated both manually and automatically.

Still another object of an embodiment of the present invention is to provide a cover assembly that can be raised and lowered by a conventional lug wrench.

Yet another object of the present invention is to provide a cover assembly that does not adversely affect the appearance of the object to be covered.

Yet still another object of the present invention is to provide a cover assembly which effectively and inexpensively seals the object to be covered.

Yet still a further object of the present invention is to provide a cover assembly which can be inexpensively and easily installed on the object to be covered.

It is also an object of an embodiment of the present invention to provide a cover assembly with a two tiered support arm structure so that the cover can be raised to greater heights for instances where such is needed.

These and other objects of the present invention will be readily apparent upon a review of the following detailed description of the preferred form of the invention and the accompanying drawings. These objects are not exhaustive and are not to be construed as limiting the scope of the claimed invention.

In summary, the present invention is directed to a cover assembly including a cover and a support frame for supporting the cover. A motor is provided to automatically raise and lower the cover such that the cover maintains a horizontal orientation throughout the raising and lowering process. In one embodiment of the present invention, the cover is also pivotally connected to the support frame so that the cover may be lifted much like a hatch back to gain access to the object being covered. In another embodiment of the present invention, the cover may be automatically and manually raised and lowered. The manual operation of the cover assembly is performed utilizing a conventional lug wrench. In a further embodiment of the present invention, the support frame includes a two tiered support arm structure so that the cover assembly can be raised to greater heights when utilized in environments requiring such, e.g. campers.

The above summary describes preferred forms of the present invention and is not in any way to be construed as limiting the claimed invention to the preferred forms.

BRIEF DESCRIPTION OF THE DRAWINGS

FIG. 2 is a plan view of the first embodiment illustrated in FIG. 1A.

FIG. 3 is a fragmentary perspective view of a variation of the first embodiment illustrated in FIG. 1A.

FIG. 4A is a plan view of a second embodiment of the present invention.

DETAILED DESCRIPTION OF THE INVENTION

The preferred embodiments of the present invention will now be described hereinafter with reference made to FIG. 1–6.

FIGS. 1–3

Figure 1A:
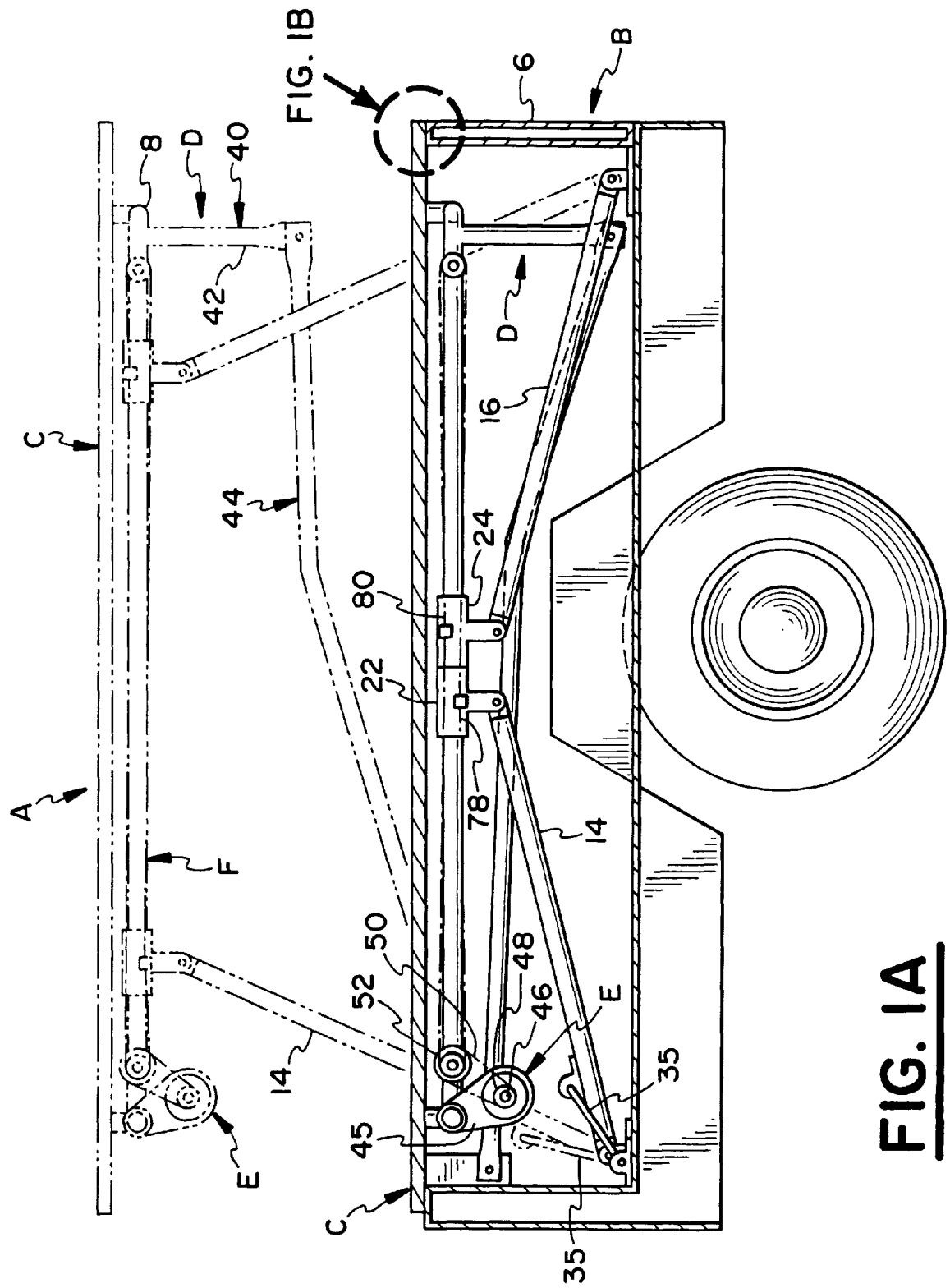
FIG. 1A is a side elevational view of a first embodiment of the present invention.
Figure 1B:
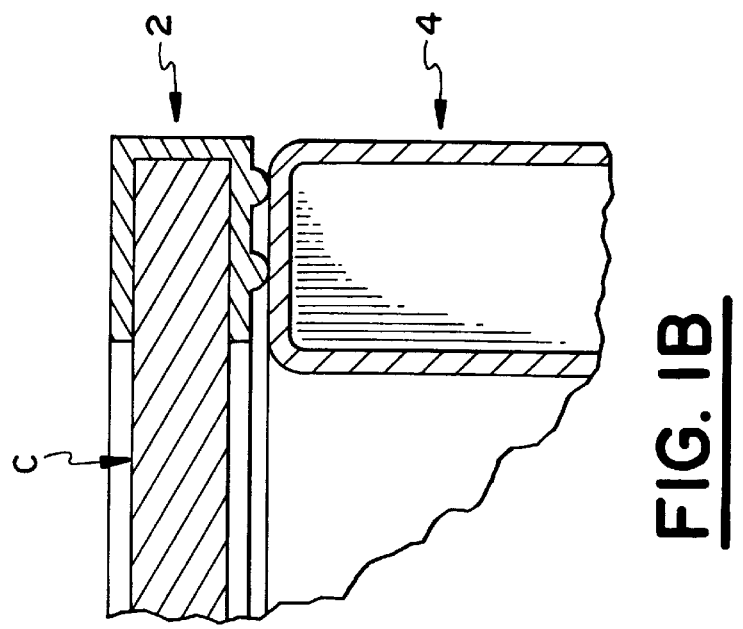
FIG. 1B is a sectional view of a portion of the first embodiment illustrated in FIG. 1.

The first embodiment of the present invention and a variation thereof will be described with reference to FIGS. 1–3. Referring to FIG. 1A, cover assembly A is mounted in bed B of a conventional pick-up truck. It is to be understood that while cover assembly A is shown as being mounted in a conventional pick-up truck bed, it can be utilized in a variety of different environments including as a cover for trailers and or campers. The cover assembly A includes a cover C, a support frame D, a motor E, and drive linkage F. The cover C is substantially rectangular in shape and has a seal 2 extending along the outer periphery thereof, as seen in FIG. 1B. The seal 2 ensures that fluid will not enter the bed B when the cover C is seated on the sidewalls 4 and tail gate 6. Preferably, the cover C is formed from fiberglass. However, it will be understood that any suitable material may be used.

The cover C is permanently fixed to the support frame D. Therefore, the cover C moves with the support frame D. Referring to FIGS. 1A and 2, the support frame D includes an upper support member 8. The upper support member 8 is substantially rectangular in shape and extends in a horizontal plane. The upper support member 8 maintains its horizontal orientation as the cover C is raised and lowered. The support frame D further includes four support arms 10, 12, 14 and 16. The upper ends of each of the support arms 10, 12, 14 and 16 are slidably connected to the upper support member 8. Specifically, support arm 10 is pivotally connected to collar 18. Collar 18 is slidably mounted on the upper support member 8. In a similar fashion, support arms 12, 14 and 16 are slidably connected to collars 20, 22 and 24, respectively. The opposite ends of support arms 10, 12, 14 and 16 are pivotally connected to the bed of the pick-up truck by mounting flanges 26, 28, 30 and 32, respectively. Lateral braces 33 and 35 are provided to prohibit lateral movement of the cover assembly A when the vehicle is moving and the assembly is in the extended position. Each of the ends of Brace 33 have a ball configuration adapted to mate with corresponding sockets pivotally mounted on the floor of the truck bed and the support arm 12. Brace 35 also has a ball configuration at each end to mate with corresponding sockets pivotally mounted on the floor of the bed and the support arm 14. This ball and socket arrangement permits the braces to freely pivot as the cover assembly A is raised and lowered. Similar braces may be employed in any of the other embodiments described herein. The support frame D further includes braces 38 and 40 which are positioned adjacent the left and right side walls of the truck bed B, respectively. The braces 38 and 40 are configured in an identical manner and thus only brace 40 will be described in detail. As seen in FIG. 1, brace 40 includes a vertical extension 42 and a horizontal extension 44. The vertical extension 42 is fixed to the upper support member 8. The right end of the horizontal extension 44 is pivotally connected to the lowermost end of the vertical extension 42 by conventional fasteners. The left end of the horizontal extension is pivotally connected to the adjacent side wall of the truck bed B by conventional fasteners. Braces 38 and 40 provide the support frame D with greater stability.

Motor E is fixed to upper support member 8 adjacent the cab of a conventional pick-up truck by bracket 45. Thus, the motor E moves with the upper support member 8 as it is raised and lowered with cover C. The motor E has an output shaft 46 with a drive sprocket 48 fixed at its end. The drive sprocket 48 engages an endless chain 50 which forms part of the drive linkage F. Endless chain 50 is also drivingly connected to sprocket 52 mounted on shaft 54. Shaft 54 is rotatably mounted to upper support member 8 via mounting brackets 47, 49 and 51. As seen in FIG. 2, drive sprockets 56 and 58 are mounted on opposite ends of shaft 54. As the endless chain 50 is driven by drive sprocket 48, it in turn drives sprocket 52 thereby rotating shaft 54 and drive sprockets 56 and 58. Drive sprocket 56 is connected to endless chain 60. Endless chain 60 is also drivingly connected to sprocket 62 which is mounted on shaft 64. Shaft 64 is rotatably mounted on upper support member 8 via brackets 66, 68 and 70. Collars 18 and 20 are connected to endless chain 60. Collar 18 is connected to the lower strand of the endless chain 60 while collar 20 is connected to the upper strand of endless chain 60. This particular orientation results in collars 18 and 20 moving away from each other upon rotation of endless chain 60 in a clockwise direction and towards each other upon a counter clockwise rotation.

Drive sprocket 58 is drivingly connected to endless chain 72. Endless chain 72 is also connected to sprocket 74 mounted on shaft 64. Collars 22 and 24 are connected to endless chain 72 in the same manner that collars 18 and 20 are connected to endless chain 60. Specifically, collar 22 is connected to the lower strand 78 of the endless chain 72 and collar 24 is connected to the upper strand 80, as seen in FIG. 2. Once again, this orientation causes collars 22 and 24 to move away from each other upon rotation of endless chain 72 in a clockwise direction and towards each other with a counter clockwise rotation. Regardless of the direction of rotation, the collars 22 and 24 move in opposite directions with respect to each other. The same is true of collars 18 and 20.

The drive linkage F includes endless chain 50, drive sprocket 52, shaft 54, sprocket 56, sprocket 58, endless chain 60, drive sprocket 62, shaft 64, endless chain 72 and drive sprocket 74. Upon initial activation of motor E, drive shaft 46 rotates in a clockwise direction thereby rotating drive sprocket 46 and endless chain 50 in the same direction. This in turn rotates drive sprocket 52 and shaft 54 in a clockwise direction. With rotation of shaft 54 in a clockwise direction, drive sprockets 56 and 58 rotate endless chains 60 and 72 in a clockwise direction, respectively. Collars 18 and 20 move away from each other resulting in support arms 10 and 12 moving to a more vertical position. Similarly, collars 22 and 24 move away from each other. This in turn results in support arms 14 and 16 moving to a more vertical position. The cover C is thus raised.

To retract the cover C, the output shaft 46 is rotated in the opposite direction, i.e. counter clockwise. This causes collars 18 and 20 to move towards each other resulting in the support arms 10 and 12 moving to a horizontal position. Similarly, collars 22 and 24 move towards each other resulting in support arms 14 and 16 moving to a horizontal position. This in turn causes cover C to retract and seat on the top of sidewalls 4 and the top of tail gate 6. The orientation of collars 18, 20, 22 and 24 may be reversed such that collars 18 and 20 are connected to the upper strands of their respective endless chains and collars 22 and 24 are connected to the lower strands of their respective endless chains. With this type of orientation of the collars, a counter clockwise rotation would result in the collars moving away from each other and a clockwise rotation would result in the collars moving towards each other. It should be noted that the "ON/OFF" switch for motor E can be positioned inside of the cab or at any other convenient location.

Referring to FIG. 3, a variation of the embodiment illustrated in FIGS. 1 and 2 is depicted. Specifically, the cover assembly A' is provided with a collapsible enclosure 84. The collapsible enclosure can be made out of numerous materials which are flexible yet durable. The collapsible enclosure is connected at its upper end to the cover C and at its lower end to the bed B of the pick-up truck. Conventional snap type fasteners may be used. Collapsible enclosure 84 is provided with a zipper type window 86 and a door 88. Thus, the window 86 and door 88 may be readily attached and detached from the remaining portion of the collapsible enclosure 84 via conventional zippers.

FIGS. 4A AND 4B

The second embodiment of the present invention and a variation thereof will now be described in connection with FIGS. 4A and 4B. Cover assembly A" is similar to cover assembly A in that it includes a cover (not shown), a support frame D", a motor E", and drive linkage F". The support frame D" is of the same construction as support frame D and, therefore, it will not be described in detail. Motor E" is fixed to upper support member 8" via mounting bracket 90. Motor E" has an output shaft 92 with drive sprockets 94 and 96 fixed thereto. Drive sprocket 94 is connected to an endless chain 98 which forms a portion of the drive linkage F". The endless chain is also connected to a drive sprocket 100. Drive sprocket 100 is mounted on shaft 102. Shaft 102 has a first threaded portion 104 and a second threaded portion 106. The threads in the first threaded portion 104 run in an opposite direction to the threads in the second threaded portion 106. Collar 18" has an arm 108 with a threaded portion which meshes with the threaded portion 104. Collar 20" has an arm 110 with a threaded portion which meshes with the threaded portion 106. Because the threads in the first threaded portion 104 run in an opposite direction to the threads in the second threaded portion 106, collars 18" and 20" move in opposite directions upon rotation of shaft 102. When the rotation of the shaft 102 is clockwise, the collars 18" and 20" move away from each other and upon a counter clockwise rotation collars 18" and 20" move toward each other.

Drive sprocket 96 is connected to an endless chain 112. Endless chain 112 is also connected to sprocket 114. Sprocket 114 is mounted on shaft 116. Shaft 116 has a first threaded portion 118 and a second threaded portion 120. The threads in the first threaded portion 118 run in an opposite direction to the threads in the second threaded portion 120. It should be noted that the threads in threaded portion 104 run in the same direction as the threads in threaded portion 118. Collar 22" has an arm 122 having threads meshing with the threads of the first threaded portion 118. Collar 24" has an arm 124 having threads meshing with the threads of the second threaded portion 120. The end of shaft 116 adjacent the tail gate 6" is configured in the form of a conventional lug to receive a conventional lug wrench 126. This permits the cover assembly A" to be raised and lowered manually by a conventional lug wrench. A pair of shock absorbers 128 and 130 are fixed at one end to the adjacent sidewalls of the truck bed and at the other end to shafts 102 and 116, respectively. The drive linkage F" includes endless chain 98, sprocket 100, shaft 102, endless chain 112, sprocket 114 and shaft 116.

Upon initial activation of motor E", shaft 92 is rotated in a clockwise direction as viewed from the front of the pick-up truck. This in turn causes endless chains 98 and 112 to move in a clockwise direction thereby rotating shafts 102 and 116 in a clockwise direction. Collars 18", 20", 22" and 24" move outwardly. The corresponding support arms in turn move to a vertical position thereby raising the cover. To retract the cover, the output shaft 92 is rotated counter clockwise as viewed from the front of the pick-up truck.

Figure 4B:
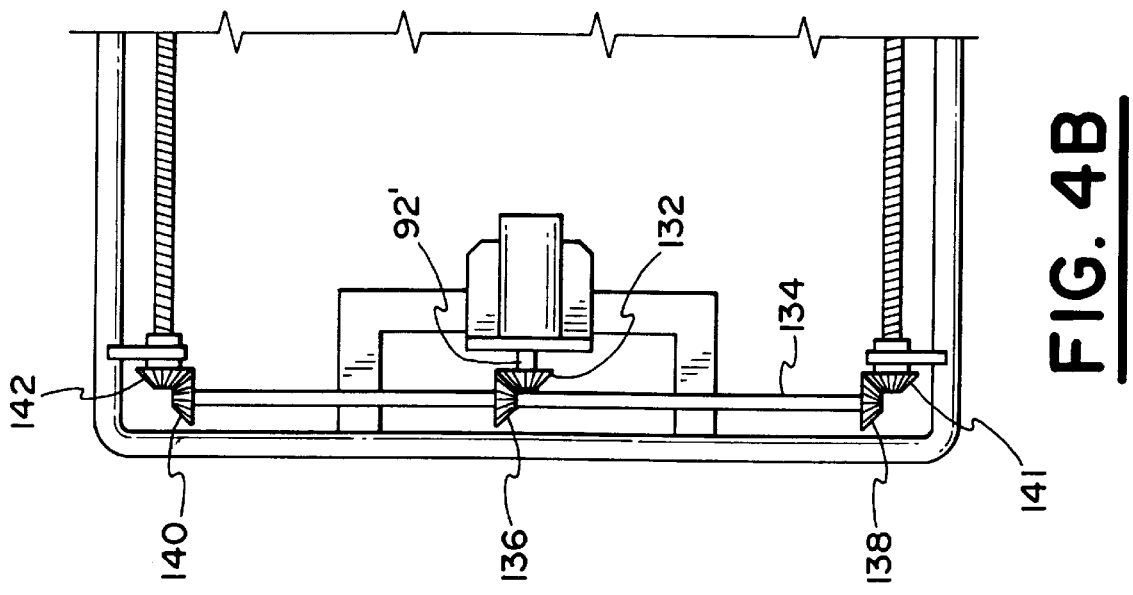
FIG. 4B is a fragmentary plan view of a variation of the second embodiment illustrated in FIG. 4A.

Referring to FIG. 4B, a variation of the second embodiment is depicted. The variation involves the replacement of the chain and sprocket portion of the drive linkage F", with a direct drive linkage utilizing bevel gears. Specifically, drive shaft 92' is provided with a bevel gear 132. Shaft 134 is rotatably connected to the upper support member 8". The shaft 134 includes three bevel gears 136, 138 and 140. Bevel gear 136 is driven by bevel gear 132. Bevel gears 138 and 140 in turn drive bevel gears 141 and 142, respectively.

Unlike the embodiment disclosed in FIG. 4A, the threading of the shaft having bevel gear 141 is exactly opposite to the threading of the shaft having bevel gear 142. This is due to the fact that upon rotation of the shaft 92' in a clockwise direction, the shaft having bevel gear 141 is rotated in a clockwise direction while the shaft having bevel gear 142 is rotated in a counter clockwise direction.

Although collars are shown as the preferred sliding members in the first and second embodiments, it will be readily appreciated that other arrangements may be used, e.g. channel slides, bearing slides, track and groove slides and pipe slides.

FIG. 5

Figure 5:
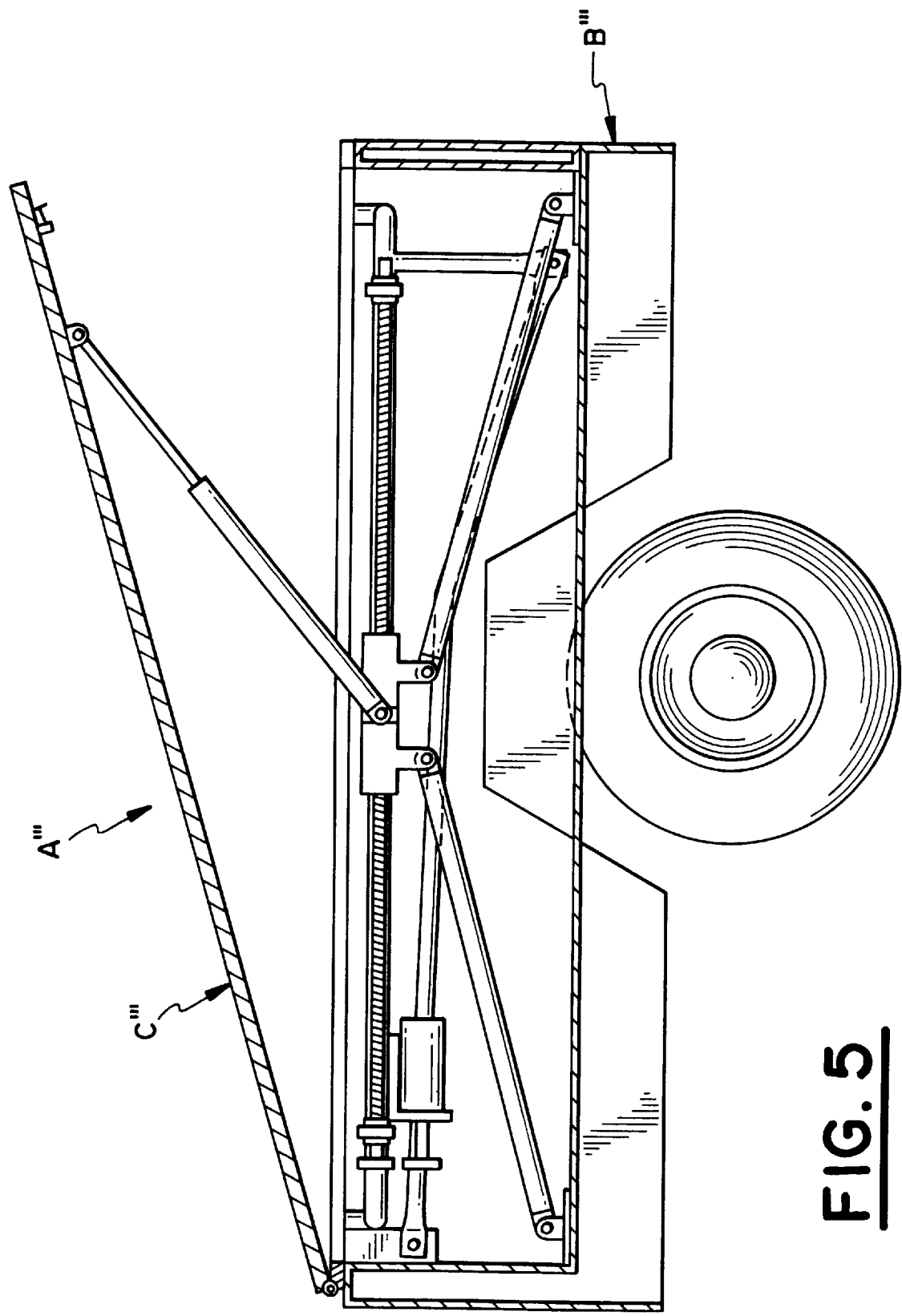
FIG. 5 is a side elevational view of a third embodiment of the present invention.

A third embodiment of present invention will now be described with reference to FIG. 5. The cover assembly A'" is substantially the same as the cover assembly A" depicted in FIG. 4A. The difference being that cover C'" is pivotally connected to the support frame D'" via a conventional means. Hence, the cover C'" can be raised in two different manners providing a greater degree of flexibility in accessing any item or items stored in the bed B'". Specifically, the cover C'" can be opened like a hatch back or it can be raised by automatically or manually raising the support frame D'". It will be readily appreciated that any other embodiment of this invention or variation thereof could be provided with a cover like cover C'", i.e. a cover which can be opened in two distinct manners. Further, while the support frame and drive linkage for this embodiment are the same as those depicted in the second embodiment, it will be readily appreciated that any other support frame and drive linkage described herein can be used.

FIGS. 6A AND 6B

Figure 6A:
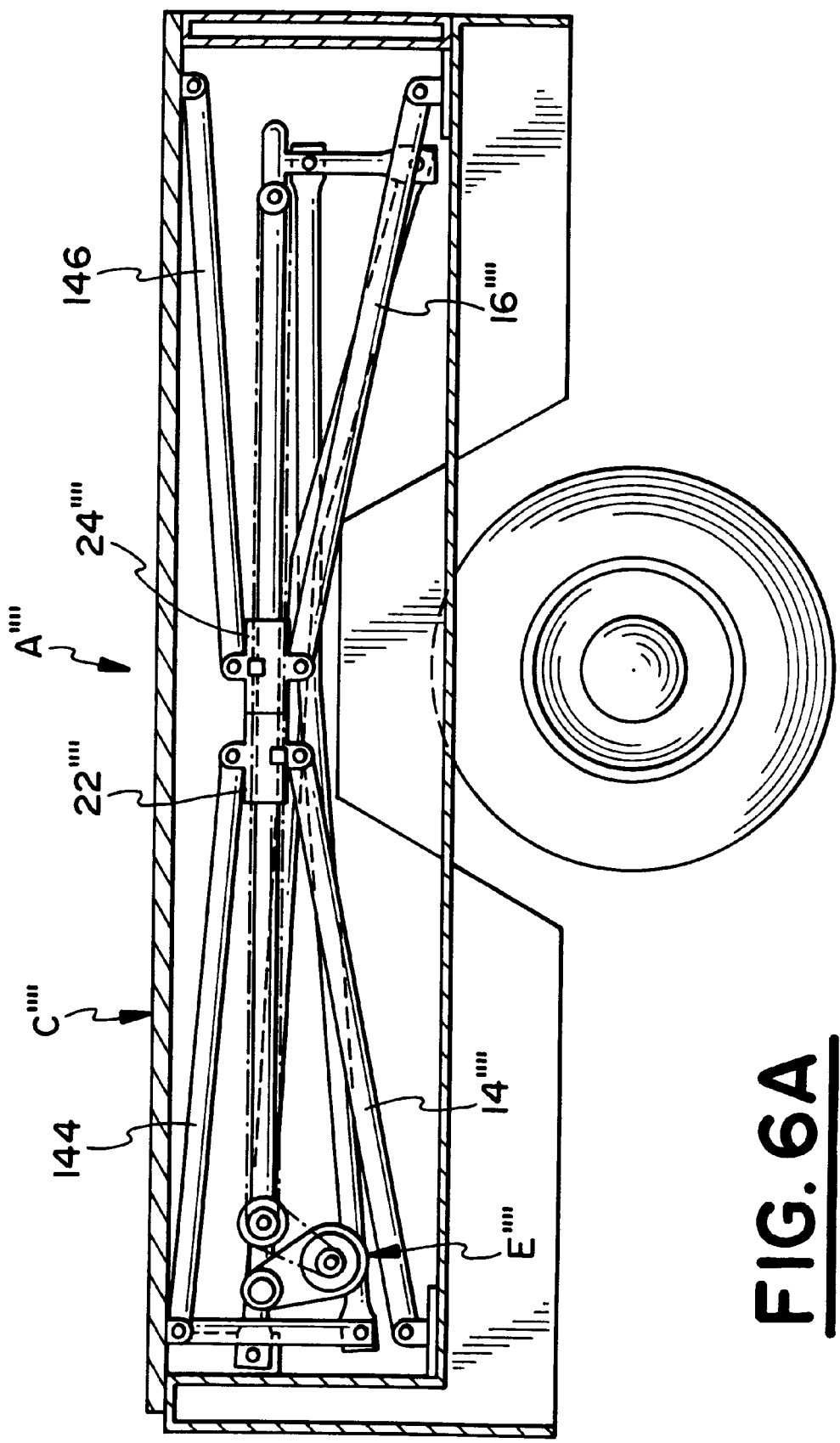
FIG. 6A is a side elevational view of a fourth embodiment of the present invention with the cover assembly in the retracted position.
Figure 6B:
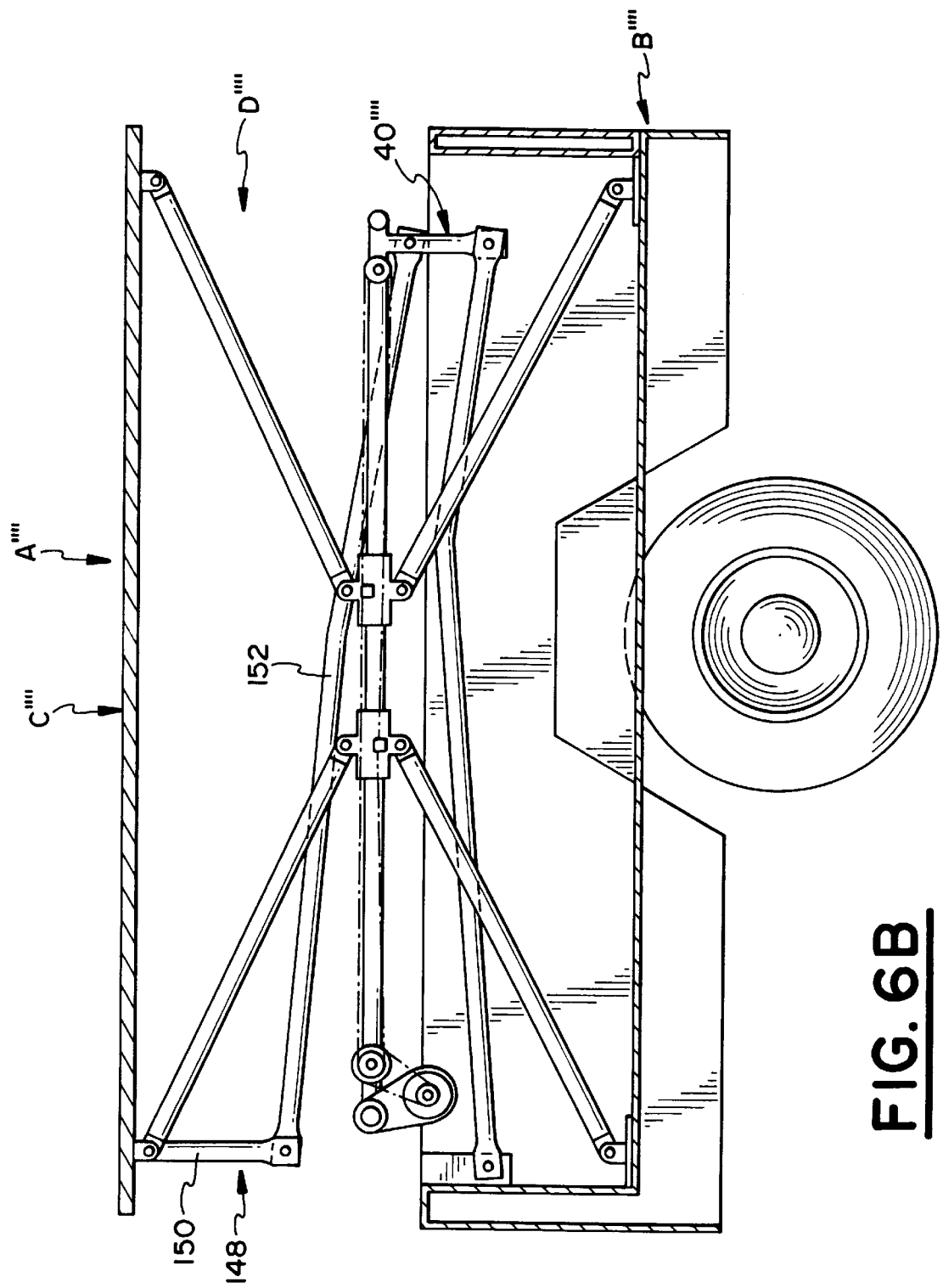
FIG. 6B is a side elevational view of the fourth embodiment of the present invention with the cover assembly partially extended.

A fourth embodiment of the present invention will now be described with reference to FIGS. 6A and 6B. The cover assembly A"" is similar to the cover assembly A depicted in FIG. 1A with one major difference. Specifically, the support frame D"" of the cover assembly A"" is provided with a two tier structure. This is accomplished by providing two additional support arms and a brace on each of the left and right sides of the support frame D"". Only the right side (as viewed from the tail gate) of support frame D"" is depicted in FIGS. 6A and 6B, since the left side is the mirror image thereof. Collar 22"" is pivotally connected to lower support arm 14"" and upper support arm 144. Collar 24"" is pivotally connected to lower support arm 16"" and upper support arm 146. The opposite ends of upper support arms 144 and 146 are pivotally connected to cover C"". An upper support brace 148 is provided having a vertical extension 150 and a horizontal extension 152. The horizontal extension 152 is pivotally connected to the vertical extension 150 at one end and at the other end to the vertical extension of lower brace 40"". The two tiered structure of this embodiment permits the cover C"" to be raised to a greater height to accommodate environments requiring such.

While this invention has been described as having a preferred design, it is understood that it is capable of further modifications, uses and/or adaptions following in general the principle of the invention and including such departures from the present disclosure as come within the known or customary practice in the art to which the invention pertains and as maybe applied to the central features hereinbefore set forth, and fall within the scope of the invention and the limits of the appended claims.

We claim:

1. A moveable cover assembly for covering a bed of a pick-up truck, comprising:
   a) a cover suitably sized and shaped to substantially cover the bed of a pick-up truck;
   b) a support frame for supporting said cover, said support frame includes at least a pair of first support arms and a pair of second support arms, and an upper support member extending substantially horizontally, at least one of said pair of first support arms and at least one of said pair of second support arms being slidably connected to said upper support member;
   c) at least one fastener for securing said support frame to the bed of a pick-up truck;
   d) a motor; and,
   e) a drive linkage connected to said pair of first support arms for moving said first pair of support arms in opposite directions upon actuation of said motor.

2. A moveable cover assembly as set forth in claim 1, wherein:
   a) said drive linkage includes a drive chain.

3. A moveable cover assembly as set forth in claim 1, wherein:
   a) said drive chain includes a screw having first and second portions, said first portion has threads running in a first direction and said second portion has threads running in a second direction, said second direction is opposite to said first direction.

4. A moveable cover assembly as set forth in claim 1, further including:
   a) a plurality of flexible sidewalls detachably connected to said cover, said flexible sidewalls expand and collapse upon raising and lowering of said cover.

5. A moveable cover assembly as set forth in claim 4, wherein:
   a) one of said flexible sidewalls includes a flexible door.

6. A moveable cover assembly as set forth in claim 1, wherein:
   a) said drive chain includes first and second endless chains, said first and second endless chains are drivingly connected to said motor.

7. A moveable cover assembly as set forth in claim 1, wherein:
   a) said cover includes a front, a rear, a left side and a right side, said first and second support arms are positioned adjacent said left side.

* * * * *